United States Patent
Niida et al.

[15] 3,678,159

[45] July 18, 1972

[54] ANTIBIOTICS OBTAINED FROM STREPTOMYCES MIHARAENSIS

[72] Inventors: Taro Niida; Hiroshi Yumoto; Takashi Tsuruoka, all of Kanagawa-ken; Kazuko Hamamoto, Tokyo; Jakashi Shomura, Kanagawa-ken; Takawo Ohashi, Tokyo, all of Japan

[73] Assignee: Meiji Seika Kaisha Ltd., Tokyo, Japan

[22] Filed: Dec. 24, 1968

[21] Appl. No.: 791,856

Related U.S. Application Data

[63] Continuation-in-part of Ser. No. 626,470, March 28, 1967.

[30] Foreign Application Priority Data

March 28, 1966 Japan..................................41/18691

[52] U.S. Cl................................................424/116, 195/80

[51] Int. Cl.......................................A61k 21/00, C12b 1/00
[58] Field of Search..........................424/116, 115; 195/80

[56] References Cited

UNITED STATES PATENTS

| | | | |
|---|---|---|---|
| 3,089,816 | 5/1963 | Gaeumann et al. | 167/65 |
| 3,272,709 | 9/1966 | Bergy et al. | 167/65 |
| 3,089,816 | 5/1963 | Gaeumann et al. | 424/115 |
| 3,272,709 | 9/1966 | Bergy et al. | 424/116 |

*Primary Examiner*—Sam Rosen
*Attorney*—Wenderoth, Lind & Ponack

[57] ABSTRACT

Miharamycin A and miharamycin B, obtained by cultivating selected strains of actinomyces (*Streptomyces miharaensis*), have a strong inhibition activity against microbes of rice blight and those of Pseudomonas and exhibit an effective activity against plant virus.

5 Claims, 4 Drawing Figures

ANTIBIOTICS OBTAINED FROM STREPTOMYCES MIHARAENSIS

This application is a continuation of our application Ser. No. 626,470, filed Mar. 28, 1967.

The present invention relates to a process for the preparation of novel antibiotic substances called "miharamycin A" and "miharamycin B" which are obtained by cultivating selected strains of actinomyces.

The present inventors have found that in the culture of a specific strain belonging to actinomyces, an antibiotic substance is produced which has a strong inhibition activity against microbes of rice blight and those of Pseudomonas and exhibiting an effective activity also against plant virus. The inventors extracted these effective substances from the culture with success and named "miharamycin A" and "miharamycin B," respectively.

As the strain of actinomyces to be used in the process of the present invention, an actinomyces is mentioned which has an ability of producing in the culture miharamycins A and B in amounts sufficient for them to be extracted, thus a new actinomyces which has been isolated by the present inventors from soils in Mihara City of Hiroshima Prefecture and Toyonaka City of Osaka-fu and named by them "*Streptomyces miharaensis*" being employed as such. The microbiological properties of "*Streptomyces miharaensis nov. sp.*" (referred to "the present strain" hereinafter) as a representative strain of the actinomyces are as follows:

I. Morphological characteristics
 1. Acrial mycelium: Sporophores with closed and open spirals
 2. Spore: Oval shape, 1.0–1.4 by 0.6–0.8 micron in size, surface smooth.
II. Properties of the strain on various sorts of culture medium:

| Culture medium | Growth | Acrial mycelium | Soluble pigment | Others |
|---|---|---|---|---|
| Sucrose-Czapek-agar | Good;penetrates into the agar; pale yellow | None | Light cream color | |
| Glucose-Czapek-agar | Whitish | None | None; or cream color | |
| Glucose-asparagine-agar (Krainsky) | Good, raised; pale yellow (some colonies with olive color tinge) | Poor; white to brownish grey | None | |
| Glucose-asparagine-agar (Ushinsky) | Good; pale yellow | Scant, little in margin of growth, white to grey | None | |
| Calcium-malate-agar | None | | | |
| Glycerine-calcium-malate-agar | Good; color changes from olive pale yellow to light yellowish brown | None | Yellowish brown | |
| Meat extract-agar | Mossy cream color | None | Brown | |
| Glucose-meat extract-agar | Good; fine winkled | None | Brown | |
| Starch-ammonium-sulfate-agar | Color changes from light yellow to light yellowish brown | Poor;color changes from white to grey - brownish grey | None | Strong hydrolysis of starch |
| Starch-yeast extract-agar (M/15 phosphate buffer at pH 7.0 is substituted for tap water) | Light yellow-light brownish yellow | Good; fawn mixed with white spots | Yellowish brown | |
| Potato plug | Good growth in protuberances; light brown | None | Dark brown around growth | |
| Carrot plug | Cream color | None | Almost none | |
| Loeffler's coagulated serum | Smooth growth; color changes gradually from greyish yellow to dark greyish brown | None | Greyish colored | Culture medium is not liquefied, grows likewise even at 37° C |
| Egg medium | Good growth in a wrinkled state; dark brown | None | None | Grows likewise even at 37° C |
| Skim milk | Growth in a ring state; color changes from cream gradually to brown | | Dark brown | Quick peptonization without coagulation, pH 6.2–6.4 after 2 weeks); grows likewise even at 37° C |
| Meat extract-gelatin culture medium (20°C, 40 days) | Creamy | None | Dark brown | Peptization proceeds gradually |

Note: - Unless particularly described of observations were carried out after 20 days of cultivation at 28°C III. Physiological characteristics:

| | |
|---|---|
| Production of H$_2$S | Positive |
| Thyrosinase reaction | Positive |
| Nitrite producing reaction | Positive |
| Hydrolysis of starch | Strong |
| Gelatin liquefaction | Gradually proceeding |
| Liquefaction of coagurated serum | None |

IV. Utilization of carbon sources:

| | |
|---|---|
| Utilized | Arabinose, xylose, rhamnose, glucose, galactose, mannose, fructose, maltose, sucrose, lactose, raffinose, dextrin, starch, glycerine, sorbital, manuital, inositai, sodium acetate, sodium succinate, sodium citrate |
| Doubtful utilization | Salicin |
| Not utilized | Inulin, dulcitol, cellulose |

As above described, the present strain grows on synthetic agar and is cream to pale yellow in color, sometimes having a tinge of olive. On an organic medium a brown pigment is produced in general. Aerial mycelium of the present strain, on the ordinary agar medium is scant in general, develops in two types, i.e., open and closed types of spirals. The condium has a smooth surface. Carbon source utilization spectrum of the strain is of a wide range type. When such an actinomyces is searched among the well-known species of microbes, there may be found as particularly nearly related thereto *Streptomyces filipinensis* (Aman, A. et al.: Phytopathology, 45, 559–565 (1955)), any other strains being not appropriate. While *Streptomyces filipinensis* produces a polyen antibiotic substance "Filipin," the present strain produces a water soluble basic type of new antibiotic substance miharamycin. Therefore, these two strains have in regard to the produced antibiotic substance little relation to each other. Comparison of characteristics between the two strains is summarized in the following table.

| | STRAIN | |
|---|---|---|
| | *Streptomyces filipinensis* | The present strain |
| Aerial mycelium | Sporophores form spirals that vary from open to tightly closed | Sporophores with closed and open spirals |
| Synthetic agar | G: Bright yellow | G: Pale yellow |
| | A: Cottony, white-grey (colorless drops of exudate on mycelium) | A: Not formed |
| | S: Slightly yellowish | S: Pale cream |

| | Strain | |
|---|---|---|
| | *Streptomyces filipinensis* | The present strain |
| Starch agar | G: Good<br>A: White-grey<br>S: Not produced<br>L: Hydrolysis weak | G: Pale yellow-light yellowish brown<br>A: Poor; grey-brownish grey<br>S: Not produced<br>L: Hydrolysis strong |
| Glycerine agar | G: Good<br>A: White-grey<br>S: Slightly yellowish | G: Good; pale yellow with an olive tint<br>A: Not formed<br>S: Yellowish brown |
| Nitrate reduction | Little, if any | Nitrite formation can be clearly observed (positive) |
| Utilization of carbon source | Rhamnose: —<br>Sorbitol: —<br>Inulin : +<br>Salicin: —<br>Dulcitol: — | Rhamnose: —<br>Sorbitol: +<br>Inulin : —<br>Salicin: ±<br>Dulcitol: — |

Note: - G: Growth; A: Aerial mycelium;
S: Soluble pigment; L: Liquefaction

Comparing the present strain with *Streptomyces filipinensis*, the tendency of spiral formation is the same type and the growth colors on synthetic agar are similar to each other. Besides, both the strains have properties in common that they produce a brown pigment on an organic culture medium, that they do not form aerial mycelia on a nutrient agar and potato plug and that they have wide range spectrum for carbon source.

However, the property of *Streptomyces miharaensis nov. sp.* that it is difficult for this strain to develop aerial mycelia on various agar media is a very peculiar distinction. Because of this peculiarity it is necessary for the formation of aerial mycelium to employ a special agar culture medium containing starch-yeast extract added with a phosphate buffer of pH 7.0. On the contrary, *Streptomyces filipinensis* is able despite its some degree of similarity to the present strain to easily develop aerial mycelia on a synthetic agar, glycerine agar and starch agar. Again as to the color of aerial mycelium, while fawn with white spots is peculiar to the present strain, *Streptomyces filipinensis* develops grey at the utmost.

While the hydrolysis of starch and nitrate reducing tendency of the present strain are quite remarkable, they are weak or obscure in the case of *Streptomyces filipinensis*.

Although the present strain closely resembles *Streptomyces filipinensis* in that the carbon source spectra are of wide range type for both strains, they are quite distinctive from each other in the property of utilizing rhamnose, inulin and sorbitol.

As mentioned above, the present strain is distinguished from *Streptomyces filipinensis* in the color of aerial mycelium as well as in physiological properties. Besides, the present strain is very peculiar in the point that definite conditions are required for the development of aerial mycelium. Thus, the present inventors attached importance to this point of the present strain, considered it to be a new species of actinomyces and named it as *Streptomyces miharaensis nov. sp.* A.T.C.C. deposition number of the present strain is 19,440.

Additionally remarking, the present inventors isolated besides the aforesaid *Streptomyces miharaensis* nov.sp. SF-551 strain and SF-552 strain respectively from different soils, of which mycological characteristics were confirmed to be similar to those of *Streptomyces miharaensis nov. sp.*, and established a new species "*Streptomyces miharaensis*" as actinomyces which produce novel antibiotic substances "-miharamycin A and miharamycin B." These strains, being as unstable in properties as observed on other actionmyces, exhibit variation in response to artificial variation means such as, for example, the irradiation by ultraviolet ray, X-ray, high frequency light wave or radiation as well as by the treatment with chemical agent. In spite of their low stability all the strains belonging to *Streptomyces miharaensis* and hence capable of producing miharamycins A and B can be used in the process of the present invention.

Thus, the gist of the present invention is a process for the preparation of miharamycins A and B, which comprises cultivating the strains of *Streptomyces miharaensis* producing miharamycins A and B and extracting the miharamycins from the culture.

The present invention shall be further described referring to the attached drawings.

Figure 1:
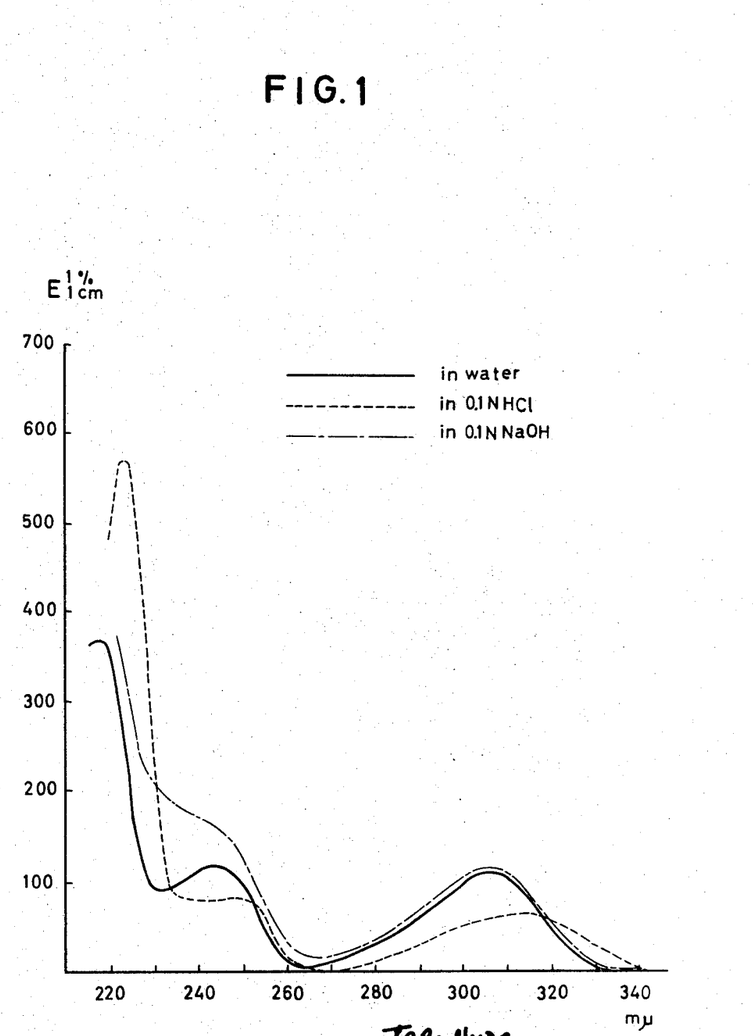
FIG. 1 shows a curve of the ultraviolet absorption spectrum of miharamycin A.
Figure 2:
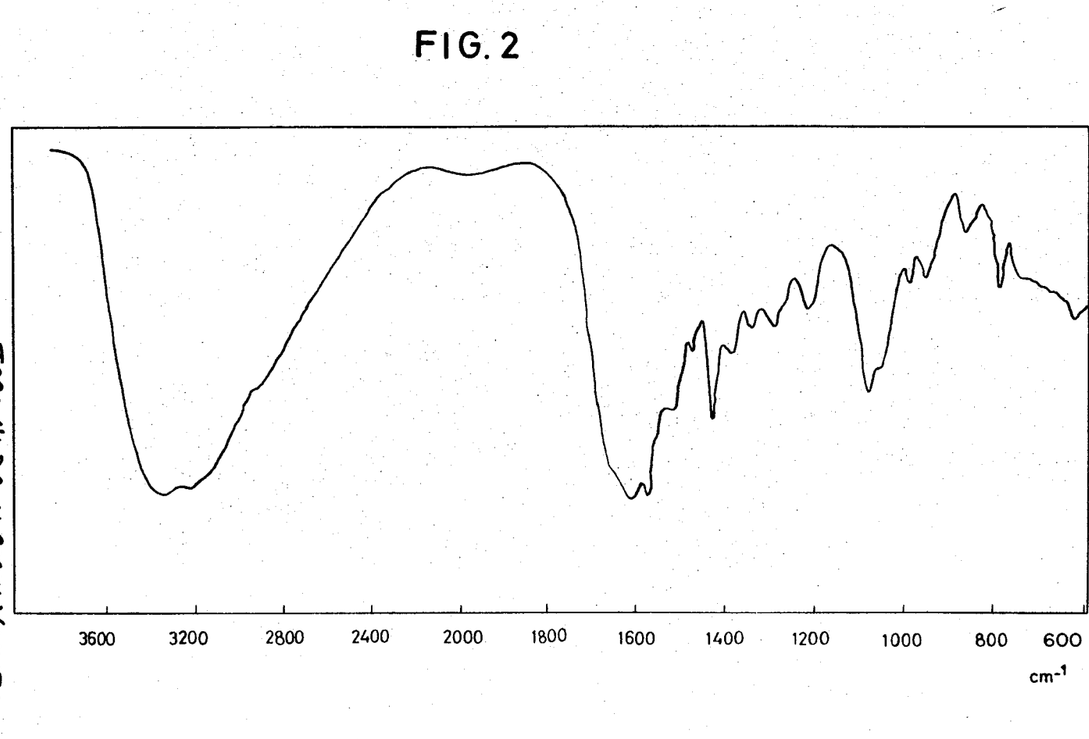
FIG. 2 shows a curve of the ultraviolet absorption spectrum of miharamycin B.
Figure 3:
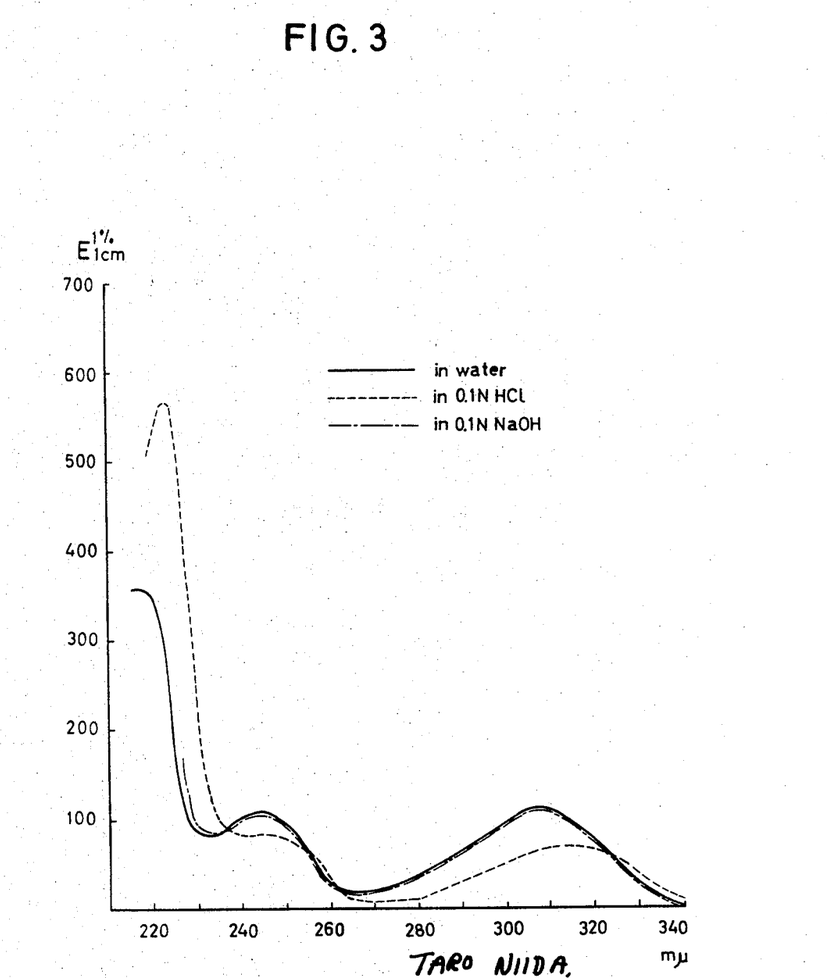
FIG. 3 shows a curve of infrared absorption spectrum of miharamycin A.
Figure 4:
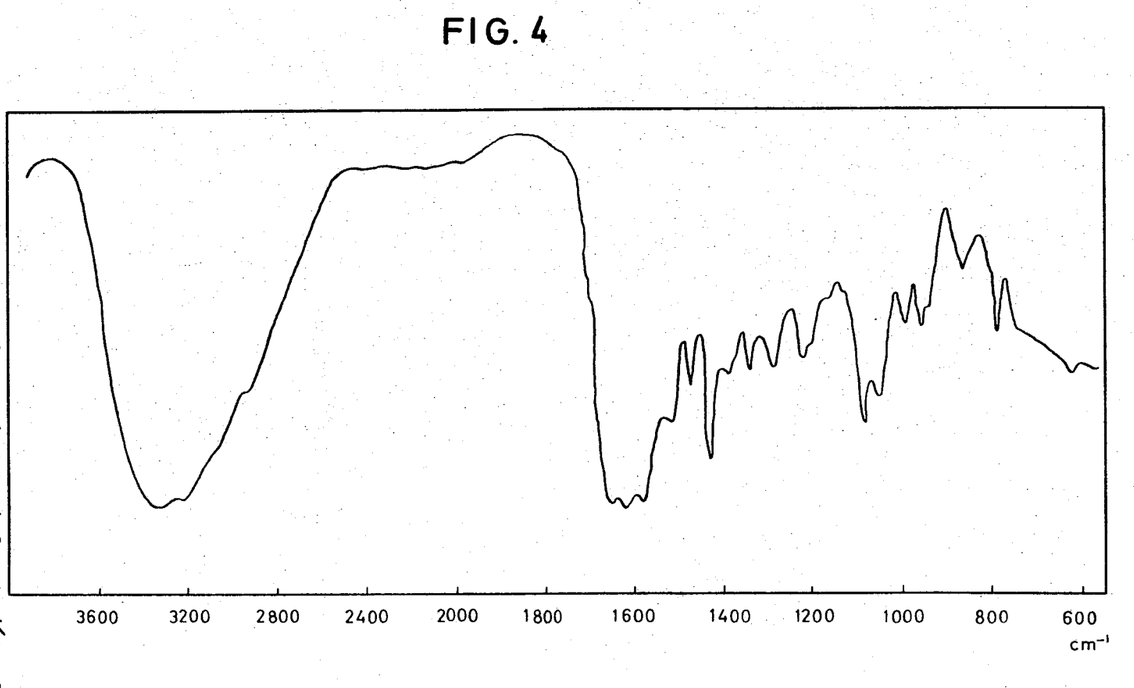
FIG. 4 shows a curve of infrared absorption spectrum of miharamycin B.

In the process of this invention, the above-mentioned strains are cultured on a cultivation medium containing nutriments which normal microbes can make use of. As nutrient sources, the well-known nutriments which have hitherto been utilized in the cultivation of actinomyces may be employed. For example, glucose, starch, glycerine, dextrin and the like can be used as carbon source. As nitrogen source, on the other hand, can be used powdered soybean, meat extract, pepton, distiller's solubles, corn steep liquor, ammonium sulfate, sodium nitrate and etc. Further more, not only inorganic salts such as calcium carbonate, common salt, potassium chloride, phosphates but also organic and inorganic substances which foster the growth of the microbe and promote the production of miharamycin can adequately be added, if necessary. As the method of cultivation, similarly to that for producing the ordinary kinds of antibiotics, a liquid cultivation method, especially the method of deep aerated submerged cultivation is most preferable. Cultivation is carried out under aerobic conditions and the temperature suitable for the cultivation is within a range of 25°–35 °C but in most cases cultivation is carried out at a temperature near 28°C. Thus, the production of miharamycin reaches its peak after 2–5 days in both shaking cultivation and tank cultivation.

In assaying miharamycin, the following procedure is employed: As the culture medium for assay is used a culture ground containing 0.5 percent of glucose, 0.5 percent of pepton and 1.5 percent of agar and adjusted of pH to 7.0. As the assay microbe is used *Pseudomonas tabaci*. When miharamycin is assayed by using this microbe, the relation of logarithmic concentration to inhibition circle is represented in a linear relation in the range of 5γ/mol–20γ/mol, the diameter of inhibition circle being 15–30mm.

Miharamycin, being possessed of such properties as mentioned below, can be extracted and refined by taking advantage of these properties. Thus, the miharamycin produced in cultivation is extracted directly or from the liquor filtrated beforehand. The miharamycin is then adsorbed onto a cation exchanging resin and thereafter eluted with an acidic or basic water or such added with a solvent. After concentration of the elute, the miharamycin is adsorbed to a column of active charcoal and eluted with aqueous acetone, aqueous alcohol or a mixture thereof with hydrochloric acid, an active part being then concentrated. When the concentrate is subsequently treated with an aluminum column and eluted with aqueous acetone, it gets free from coloring impurities. When the product thus obtained is treated with a column of anion exchanging resin and chromatographically developed by means of water and dilute hydrochloric acid, miharamycin B as free base comes eluted as contained in an aqueous layer and miharamycin A as hydrochloride does so as contained in an acidic part. The free base is concentrated, neutralized with hydrochloric acid on the one hand and the acidic fraction is neutralized by treating with Amberlite IR–45 (registered trade mark) and concentrated on the other, both the products being then separately lyophilized and pulverized. When these powdered products are dissolved in small amounts of water and left standing after the addition of appropriate quantities of acetone, ethanol or methanol, there precipitate crude crystals. When these crude crystalline preparations are recrystallized from water or a system of water-ethanol or water-methanol, there are obtained respectively miharamycin A hydrochloride and miharamycin B hydrochloride each as fine rhombic crystals.

The crystals obtained by the above process are fairly stable in either case of miharamycins A and B. However, when made up into dilute solutions of 200mcg/ml and the solutions are subjected at a pH between 2 and 9 to heat treatment at 100°C for 30 minutes or to leaving intact at 37°C for 6 days, either substance tends in an acidic region of pH to be reduced in effective value, appearing rather stable in neutral and alkaline region of pH.

Some physicochemical properties of miharamycins A and B will now be described in the following:

| Miharamycin A | Miharamycin B |
|---|---|
| 1. Melting point Acquires a red tint (on microblock) at 193°C and decomposes at 210 - 214°C (hydrochloride, fine rhombic | Tinged with pink at 195°–207°C and decomposed at 215°–218°C (hydrochloride, fine rhombic crystal) |
| 2. Solubility Both A and B are easily soluble in water, slightly soluble in methanol, insoluble in nonaqueous solvents such as ethanol, acetone, chloroform, butyl acetate, carbon tetra- chloride, benzene, hexane, ether and soluble in aqueous solvents such as aceton-water and ethanol-water. | |
| 3. Ultraviolet absorption (Hydrochloride) (Water) 217–218 m$\mu$ ($E_{1cm}^{1\%}$ 365) 244 m$\mu$ ( " 105) 307 m$\mu$ ( " 108) (0.1N HCl) 223 m$\mu$ ($E_{1cm}^{1\%}$543) 239–249 m$\mu$(Shoulder) ($E_{1cm}^{1\%}$87) 314 m$\mu$ ( " 70) (0.1N NaOH) 307 m$\mu$($E_{1cm}^{1\%}$105) | 218 m$\mu$ ($E_{1cm}^{1\%}$368) 244 m$\mu$ ( " 106) 307 m$\mu$ ( " 110) 223 m$\mu$ ($E_{1cm}^{1\%}$568) 239–245 m$\mu$(Shoulder) ($E_{1cm}^{1\%}$81) 314 m$\mu$ ( " 66) 244 m$\mu$ ($E_{1cm}^{1\%}$105) 307 m$\mu$ " 110) |
| 4. Molecular weight (Neutralization 314 (Hydrochloride value by titration) Elementary analysis (Hydrochloride) C 40.07% H 6.02 N 21.59 Cl 9.12 Ash 0 | 619 (Hydrochloride) 571 (Free base) C 39.89% H 5.97 N 22.08 Cl 4.98 Ash 0 |
| 6. Molecular formula $(C_{11}H_{12}O_5N_5 \cdot HCl)_n$ (M.W. 337 × n) Approximate coincidence of A and B in UV absorption wave number and $E_{1cm}^{1\%}$value suggests | $C_{21}H_{36}O_{11}N_{10} \cdot HCl$ (M.W. 640) | that n = 2

| 7. Infrared absorption (Hydrochloride) (KBr tablet) | 3341, 3209, 1620, 1585, 1517, 1482, 1435, 1381, 1342, 1290, 1219, 1090, 1050, 993, 960, 873, 799 cm$^{-1}$ | 3341, 3208, 2951, 1659, 1621, 1585, 1518, 1483, 1437, 1342, 1288, 1217, 1089, 1063, 992, 863, 873, 795 cm$^{-1}$ |
|---|---|---|
| 8. Color reaction (Color development on silica gel film chromatogram) | Positive: Ninhydrin, Ehrlich, Sakaguchi (weak), potassium permanganate Negative: FeCl$_3$, aniline hydrogen phthalate | Positive: Ninhydrin, Ehrlich, Sakaguchi (orange), potassium permanganate (weak) Negative: FeCl$_3$, aniline hydrogen phthalate |
| 9. Filter paper electrophoresis (350 volt, At pH 5.0, 3 hrs) | 2.3cm toward (−) pole | At pH 5.0, migrates 2.5cm toward (−) pole |

As miharamycins A and B have the physicochemical properties mentioned above and are closely correlated, thin layer chromatography tends to fail in separating them from each other. As a result of investigation, however, the following methods were established which enables these miharamycins to be distinguished as separate spots.

(1) Thin layer chromatography with silica gel.

| Solvent system | Rf value Miharamycin A | Miharamycin B |
|---|---|---|
| 1. Upper layer of chloroform-methanol-17% aqueous ammonia (2:1:1) | 0.84 | 0.62 |
| 2. n-Propanol-pyridine-acetic acid-water (15:10:3.10) | 0.70 | 0.64 |

Detection method: By potassium permanganate, the A substance is quickly oxidized but the color development of the B substance takes place after 2–3 minutes.

(2) Thin layer chromatography with cellulose.

| Solvent system | Rf Value Miharamycin A | Miharamycin B |
|---|---|---|
| 1. Upper layer of chloroform-methanol-17% aqueous ammonia (2 : 1 : 1) | 0.72 | 0.55 |

Detection method: Ninhydrin

An example of antibacterial spectra of miharamycins A AND B observed with various species of microbes is given in the following table.

Antibacterial activity assayed by the paper disc —

Plate method

| Test organisms | Inhibitory diameter (mm) Miharamycin A (500 /ml) | Miharamycin B ( 300 /ml |
|---|---|---|
| *Bacillus subtilis* | 0 | 0 |
| *Bacilus circulons* | 0 | 0 |
| *Sarcina lutea* | 0 | 0 |

| Test organisms | | |
|---|---|---|
| Micrococcus radiodurans | 13.7 | 12.0 |
| Staphylococcus aureus 209-P | Small | Small |
| Corynebacterium equi | 0 | 0 |
| Escherichia coli K-12 | 0 | 0 |
| Salmonella typhi | 0 | 0 |
| Shigella dysenteriae | 0 | 0 |
| Klebsiella pneumoniae | Small | Small |
| Pseudomonas tabaci | 26.0 | 25.5 |
| Pseudomanas aeruginosa | (25.4) | (17.2) |
| Pseudomanas fluorescens | 12.3 | 11.3 |
| Xanthomonas oryzae | 0 | 0 |
| Mycobacterium 607 | 0 | 0 |
| Candida albicans | 0 | 0 |
| Piricularia oryzae | 69.5 | 61.5 |

As definitely shown by the above table, antimierobial spectrum of miharamcin A is almost the same as that of miharamycin B and these antibiotics are characterized in their exhibiting eminent activity against microbes of Pseudomonas genus and Piricularea oryzae. Examination by serial dilution method for minimum inhibitory concentration against microorganisms of Pseudomonas genus furnished the result shown in the following table.

Antimicrobiol activity assayed by dilution method

| Test organisms | Min imum inhibitory concentration | |
|---|---|---|
|  | Mihara-mycin A | Mihara-mycin B |
| Pseudomonas tabaci | 1.6 | 0.8 |
| Pseudomonas aeruginosa | 6.4 | 6.4 |

Miharamycines A and B proved to have no effect on adult of Scarlet killifish (8 months after hatching) even when added in a concentration of 10 ppm. In an experiment with rabbit (male, body weight of 2kg) they exerted even when dropped as 0.01 percent solution in the eyes no irritation on conjunctiva, cornea, pulpebra and etc. Again, even after exposure to sunlight for 6 hours, their effective values remained as perfectly unchanged. On the other hand, miharamycins A and B are comparatively of high animal toxity; thus, in an experiment of acute poisoning conducted with mice, values of $LD_{50}$ were found in the case of venous injection to be 10–15mg/kg.

From the above described information for miharamycins A and B, this novel antibiotic seemed to be related to blasticidin S, gougerotin, kasugamycin, neburalin, puromycin, and angustmycins A and B in group of water soluble basic antibiotic or nucleic acid antibiotic, but miharamycins A and B are clearly distinguishable from the antibiotics with respect to ultraviolet absorption, shown in the following table. Since miharamycins A and B cannot thus be brought in line with any known antibiotic, they may well both be looked upon as new antibiotic substance.

| Antibiotic | Ultraviolet absorption | Reference |
|---|---|---|
| Blasticidin S | 275mμ; 0.1N HCl | Takeuchi et al: Jour.Antibiotics, 11A, 1-5(1958) |
| Gougerotin | 270mμ; 0.1N HCl | Kanzaki et al: Jour.Antibiotics, 15A, 93(1962) |
| Neblarin | 263mμ; 0.1N HCl | Nakamura: Jour. Antibiotics, 14A, 94 (1961) |
| Puromycin | 267.5mμ; 0.1N HCl | Porter et al: Antibiotics & Chemotherapy, 2, 409 (1952) |
| Angustmycin | 260mμ; water | Kyo et al: Jour. Antibiotics, 7A, 113 (1954) |
| Kasugamycin | No absorption | Umezawa et al: Jour. Antibiotics, 18A, 101 (1965) |
| Miharamycin A | 223mμ; 0.1N HCl 314mμ | |
| Miharamycin B | 223mμ; 0.1N HCl 314mμ | |

A few examples of the present invention will be given in the following with the view of that the scope of the invention is not to be limited to these examples and many other varied or modified means can of course be employed.

EXAMPLE 1

Streptomyces miharaensis nov. sp. is inoculated on a culture medium of 2 percent glucose, 1 percent pepton, 0.5 percent meat extract and 0.5 percent NaCl having apH of 7.0 and submitted to shaking cultivation at 28°C for 48 hours, a seed culture as stem being thereby prepared. Each 600ml of the stem thus prepared is inoculated on three batches of a culture medium containing 4 percent glucose, 2 percent wheat embryo bud, 3 percent SBM and 0.6 percent NaCl and having a pH of 7.0, each batch being 10 l in volume and sterilized in a 20 l capacity jar fermenter before the addition of said stem culture, and the inoculated batches are submitted to air current agitation culture at 28°C. After the lapse of 66 hours culture time, the culture liquor is filtered, 25 l of filtrate being obtained. The filtrate is adjusted of pH to 7.2, adsorbed on 2 l column of Amberlite IRC 50 (H-type), washed with water and eluted with 0.5N aqueous hydrochloric acid.

The antibiotically active elute is collected (4 l), neutralized by treating with Amberlite IR 45 (OH-type) and then concentrated by vacuum evaporation. The concentrated liquor (300ml) is adsorbed on a column of 300g active charcoal, washed with water and then eluted with 50percent aqueous acetone. The active fraction is thus collected (2.5 l), concentrated by vacuum evaporation and lyophilized, 1.3g of brown colored powder being obtained. This product is dissolved in 80ml of 50 percent aqueous acetone, adsorbed on a column of 50g alumina and then developed with 50 percent aqueous acetone. When the active fraction is collected (350ml), concentrated by vacuum evaporation and lyophilized, 0.9g of light brown powder is obtained. This product is dissolved in 10ml water, treated with a tower of 25ml Dowex (registered trade mark) 1 × 2 (OH-type) and chromatographically developed with water. When the active fraction (miharamycin B fraction: 400ml) is collected, adjusted with hydrochloric acid to pH 6.8, concentrated by vacuum evaporation and lyophilized, 109mg of white powder is obtained. This product is dissolved in 2ml water, precipitated by addition of five times amount of acetone. The precipitate is dissolved in 0.5ml water and added with ethanol. By leaving the solution standing 80mg of miharamycin B hydrochloride is obtained as fine rhombic crystal.

The resin was further eluted with 0.2N aqueous hydrochloric acid and the active fraction (miharamycin A fraction: 80ml) thus collected is neutralized by treating with Amberlite IR 45 (OH-type), concentrated under reduced pressure and lyophilized. There is obtained 450mg of light brown powder. This product is dissolved in 4ml water and precipitated thereafter by addition of 50ml ethanol. The precipitate is again dissolved in 1ml water. After this aqueous solution with ethanol is left standing, 70mg of miharamycin A hydrochloride is obtained as fine rhombic crystal.

EXAMPLE 2

300 l of a culture ground containing 4 percent sucrose, 3 percent SBM, 2 percent wheat ombryo bud, 0.6 percent NaCl and having a pH of 7.0 was inoculated with a ceed culture of

*Streptmyces miharaensis nov. sp.* (the same as in example 1) in a proportion of 5percent and with this inoculated culture ground, tank culture (in a 500 l capacity tank made of iron) was carried out at 30°C for 55 hours. By filtering this system, 300 l of filtrate was obtained inclusive of washing water percolated from microbe bodies. The filtrate was adjusted of pH to 7.0, adsorbed on a tower of 35 l Amberlite IRC 50 (H-type), washed with water and eluted with 0.5N aqueous hydrochloric acid. Active fractions were collectively neutralized by treating with Amberlite IR 45 (OH-type) and then concentrated under reduced pressure, 2 l of a syrupy product being thereby obtained. This product was adsorbed on a tower of 1.5kg of active charcoal, washed with water and eluted with 50 percent aqueous acetone (acidified with hydrochloric acid to pH 2.0). Antibiotically active elute thus collected (12 l) was neutralized and concentrated by vacuum evaporation. This concentrated liquor (400ml) was added with 400ml acetone, then treated with a tower of alumina (1kg) and developed with 50 percent aqueous acetone. Active fractions were collectively concentrated (to 200ml) by vacuum evaporation submitted to treatment with a tower of 300ml of Dowex 1 ×2 (OH-type) and then eluted with water. 300ml of the active fraction thus obtained was neutralized with hydrochloric acid, concentrated by vacuum evaporation and lyophilized, there being obtained on drying 0.6g of pale yellow powder. By crystallizing this product from water-ethanol, 0.3g of miharamycin B hydrochlorid was obtained as fine rhombic crystal. The resin tower was further eluted with 0.2N aqueous hydrochloric acid. 400ml of active fraction thus eluted was neutralized by treating with Amberlite IR 45 (OH-type), concentrated under reduced pressure (to 40ml), subjected to a tower of 50g alumina and developed with 50 percent aqueous acetone. The active fractions were collectively concentrated in vacuum evaporation and lyophilized, 3.2g of pale yellow powder being thereby obtained. Crystallization of this product from water-ethanol yielded 2.1g of miharamycin A hydrochloride.

The examples presented above are concerned with the practice of isolating and refining miharamycins A and B. However, these new substances exhibit as aforesaid so prominent antibiotic activity against Pseudomonas and *Piricularia oryzae* in particular that it is possible under circumstances to directly make use of a filtrate of culture or crude preparations thereof. For example, in the case of using them as agricultural medicines of which impurity content makes little harmful factor their isolation and purification are not necessitated.

What is claimed is:

1. A process for the preparation of new antibiotic substances miharamycins A and B characterized in that *Streptomyces miharaensis*, A.T.C.C. No. 19, 440, is cultured under aerobic conditions to cause miharamycins A and B to accumulate in the culture medium from which miharamycins A and B are extracted.

2. Miharamycin A, a substance which has the following properties:

| | |
|---|---|
| 1. Melting point (on microblock) | Acquires a red tint at 193°C decomposes at 210–214° C (hydrochloride, fine rhombic crystal); |
| 2. Solubility | Is easily soluble in water, slightly soluble in methanol, insoluble in non-aqueous solvents such as ethanol, acetone, chloroform, butyl acetate, carbon tetrachloride, benzene, hexane, ether and soluble in aqueous solvents such as acetone-water and ethanol-water; |
| 3. Ultraviolet absorption (Hydrochloride) (Water) | 217–218m$\mu$ (E $1_{1cm}^{1\%}$ 365) 244 m$\mu$ (E $_{1cm}^{1\%}$ 105) 307 m$\mu$ (E $_{1cm}^{1\%}$ 108) |
| (0.1N HCl) | 223 m$\mu$ (E $_{1cm}^{1\%}$ 543) 239–249 m$\mu$ (Shoulder) (E $_{1cm}^{1\%}$ 87) 314 m$\mu$ (E $_{1cm}^{1\%}$ 105) |
| (0.1N NaOH) | 307 m$\mu$ (E $_{1cm}^{1\%}$ 105) |
| 4. Molecular weight (Neutralization value by titration) | 314 (Hydrochloride |
| 5. Elementary analysis (Hydrochloride | C 40.07% H 6.02 N 21.59 Cl 9.12 Ash 0 |
| 6. Molecular formula | $(C_{11}H_{12}O_5N_5 \cdot HCl)_n$ (M.W. 337 × n) |
| 7. Infrared absorption (Hydrochloride) (KBr tablet) | 3341, 3209, 1620, 1585, 1517, 1482, 1435, 1381, 1342, 1290, 1219, 1090, 1050, 99 3, 960, 873, 799 cm$^{-1}$; |
| 8. Color reaction (Color development on silica gel film chromatogram) | Positive: Ninhydrin, Ehrlich, Sakaguchi (weak), potassium permanganate Negative: FeCl$_3$, aniline hydrogen phthalate; |
| 9. Filter paper electrophoresis (350 volt, 3 hrs) | At pH 5.0, migrates 2.3cm toward (−) pole. |

3. Miharamycin B, a substance which has the following properties:

| | |
|---|---|
| 1. Melting point con microblock) | Tinged with pin k at 195–207°C and decomposed at 215–218°C (hydrochloride, fine r hombic crystal); |
| 2. Solubility | Is easily soluble in water, slightly soluble in methanol, insoluble in non-aqueous solvents such as ethanol, acetone, chloroform, butyl acetate, carbon tetrachloride, benzene, hexane, ether and soluble in aqueous solvents such as acetone-water and ethanol-water; |
| 3. Ultraviolet absorption (Hydrochloride) (Water) | 218 m$\mu$ (E $_{1cm}^{1\%}$ 368) 244 m$\mu$ (E $_{1cm}^{1\%}$ 106) 307 m$\mu$ (E $_{1cm}^{1\%}$ 110) |
| (0.1N (HCl) | 223 m$\mu$ (E $_{1cm}^{1\%}$ 568) 239–245 m$\mu$ (Shoulder) (E $_{1cm}^{1\%}$ 81) 314 m$\mu$ (E $_{1cm}^{1\%}$ 66) |
| (0.1N NaOH) | 244 m$\mu$ (E $_{1cm}^{1\%}$ 105) 307 m$\mu$ (E $_{1cm}^{1\%}$ 110) |
| 4. Molecular weight (Neutralization value by titration) | 619 (Hydrochloride) 571 (Free base) |
| 5. Elementary analysis (Hydrochloride) | C 39.89% H 5.97 N 22.08 Cl Cl 4.98 Ash ) |
| 6. Molecular formula | $C_{21}H_{36}O_{11}N_{10} \cdot HCl$ (M.W. 640) |
| 7. Infrared absorption (Hydrochloride) (KBr tablet) | 3341, 3208, 2951, 1659, 1621 1585, 1518, 1483, 1473, 1342, 1288, 1217, 1089, 1063, 992, 863, 873, 795 cm$^{-1}$; |
| 8. Color reaction (Color development on silica gel film chromato- | Positive: Ninhydrin, Ehrlich, Sakaguchi (orange, potassium permanganate (weak) |

| | | | |
|---|---|---|---|
| gram | Negative: $FeCl_3$, phthalate; | aniline hydrogen | |
| 9. Filter paper electrophoresis (350 volt, 3 hours) | At pH 5.0, migrates 2.5cm toward (−) pole. | | |

4. The hydrochloride of miharamycin A.
5. The hydrochloride of miharamycin B.

* * * * *